(12) United States Patent
Maiman et al.

(10) Patent No.: US 12,051,030 B2
(45) Date of Patent: Jul. 30, 2024

(54) ARTIFICIAL INTELLIGENCE-BASED SYSTEMS AND METHODS FOR MANAGING DATA ACCESS

(71) Applicant: Capital One Services, LLC, McLean, VA (US)

(72) Inventors: Tyler Maiman, Melville, NY (US); Abdelkader Benkreira, Washington, DC (US); Brendan Way, Brooklyn, NY (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 522 days.

(21) Appl. No.: 17/318,886

(22) Filed: May 12, 2021

(65) Prior Publication Data

US 2022/0366354 A1 Nov. 17, 2022

(51) Int. Cl.
*G06Q 10/083* (2024.01)
*G06F 21/31* (2013.01)
*G06N 5/04* (2023.01)
*G06Q 40/08* (2012.01)
*H04L 67/133* (2022.01)

(52) U.S. Cl.
CPC .......... *G06Q 10/083* (2013.01); *G06F 21/31* (2013.01); *G06N 5/04* (2013.01); *G06Q 40/08* (2013.01); *H04L 67/133* (2022.05)

(58) Field of Classification Search
None
See application file for complete search history.

(56) References Cited

U.S. PATENT DOCUMENTS

| | | | |
|---|---|---|---|
| 8,565,404 B2 | 10/2013 | Shaffer et al. | |
| 8,595,292 B2 | 11/2013 | Grayson et al. | |
| 8,732,803 B2 | 5/2014 | Stibel et al. | |
| 9,310,974 B1 * | 4/2016 | Narayanan | G06F 3/0484 |
| 9,838,345 B2 | 12/2017 | Monaco et al. | |
| 10,115,141 B1 * | 10/2018 | Warman | H04L 63/0281 |
| 10,158,588 B2 | 12/2018 | Appelman | |
| 10,628,797 B2 | 4/2020 | Shraim et al. | |
| 10,929,923 B1 * | 2/2021 | Nguyen | G06Q 40/03 |
| 2003/0001883 A1 * | 1/2003 | Wang | H04L 61/25 386/E5.002 |

(Continued)

*Primary Examiner* — Kaveh Abrishamkar
(74) *Attorney, Agent, or Firm* — HUNTON ANDREWS KURTH LLP

(57) ABSTRACT

An artificial intelligence (AI) system including an AI engine is configured to receive identification information entered into an interface, receive at least one location input entered into the interface, select at least one security question and present the selected at least one security question via the interface, and receive an answer to the at least one security question. The AI engine is further configured to apply a predictive model to determine a confidence score based on the identification information entered into the interface, the location input entered into the interface, and the answer to the at least one security question and, when the confidence score exceeds a confidence score threshold, provide user location information, the user location information selected from the user location information stored in a data storage. The provided user location information can be masked to conceal the user location information from display on the interface.

19 Claims, 7 Drawing Sheets

(56) References Cited

U.S. PATENT DOCUMENTS

| | | | | |
|---|---|---|---|---|
| 2007/0041707 A1* | 2/2007 | Edmunds | ............... | G11B 27/34 |
| | | | | 386/243 |
| 2010/0161747 A1* | 6/2010 | Rayan | ..................... | H04L 51/48 |
| | | | | 709/206 |
| 2010/0274597 A1* | 10/2010 | Dill | ........................ | G06Q 40/00 |
| | | | | 705/7.29 |
| 2012/0075175 A1* | 3/2012 | Kirkup | ................ | G06F 11/3072 |
| | | | | 345/156 |
| 2013/0325669 A1* | 12/2013 | Plichta | ................... | G06Q 50/01 |
| | | | | 705/26.81 |
| 2016/0019372 A1* | 1/2016 | Clark | ..................... | G16H 10/60 |
| | | | | 705/3 |
| 2016/0225065 A1* | 8/2016 | Govindaswamy | ........................... | |
| | | | | G06Q 30/0601 |
| 2019/0354975 A1* | 11/2019 | Wettan | .................... | G06Q 20/12 |
| 2020/0019932 A1* | 1/2020 | Harris | ................ | G06Q 10/0838 |
| 2020/0394187 A1* | 12/2020 | Janzen | ................ | G06F 21/6254 |
| 2021/0049669 A1 | 2/2021 | Erez et al. | | |
| 2022/0198888 A1* | 6/2022 | Chun | .................. | G06F 3/04817 |

\* cited by examiner

| User Security Questions | |
|---|---|
| Example 1 | What is the mother's maiden name of the recipient? |
| Example 2 | How long has the recipient lived at this address? |
| Example 3 | Who is a favorite artist of the recipient? |
| Example 4 | What song is the recipient always playing? |
| Example 5 | What is the name of a relative of the recipient? |

FIG. 6

600 www.shoppingonline.com/checkout

| Full Name | David Smith |
| Address | XXXXXX |
| City | XXXXXX |
| State | XXXXXX | Zip Code | XXXXXX |

720 www.shoppingonline.com/checkout

| Full Name | David Smith |
| Address | XXXXXX |
| City | XXXXXX |
| State | NY | Zip Code | 11200 |

ARTIFICIAL INTELLIGENCE-BASED SYSTEMS AND METHODS FOR MANAGING DATA ACCESS

FIELD OF THE INVENTION

The present disclosure relates to artificial intelligence (AI) technology, and more particularly, to AI-based systems and methods for managing data access that utilizes a unique integration of systems for the management and control of personal data.

BACKGROUND

Currently, online transactions, including online shopping, are becoming increasingly popular. It is common for the payment handling and experience on an online shopping website to use memory and/or predictive intelligence using known data to fill out recipient information, such as email, shipping address, payment information, billing address, and the like. However, when a user lacks a particular data item, the user may be unable to complete the transaction at that time.

To facilitate transactions, it is common for the web interface to automatically propose portions of, e.g., a shipping address and autofill the necessary sections for the user. If a user types "123 Main" in a user interface, the web interface may provide possible completions for "123 Main" addresses by showing "123 Main Street NYC, NY," "123 Main Street Richmond, VA," "123 Main Street Chicago, IL," and so forth.

Further, users conducting an online transaction may try to ship a purchased item to a recipient other than themselves. In these cases, the recipient's address may be found by looking it up on a public record and asking the recipient for his or her address. However, if the user's purchase is intended to be a surprise, asking the recipient is not a viable means of obtaining the address.

These and other deficiencies exist. Therefore, what is needed are systems and methods for facilitating the automatic completion of online transactions with personal data.

SUMMARY

Embodiments of the present disclosure provide an artificial intelligence (AI) system for managing data access. The AI system comprises: a data storage containing user identification information, user location information, user security questions, and answers to the user security questions; a communication interface coupled to the data storage; an AI engine in data communication with the data storage and coupled to an application programming interface (API) that enables transmission of real time data through the communication interface. The AI engine is configured to: receive identification information entered into an interface for an online purchase displayed on a web page of a merchant; receive at least one location input entered into the interface; select at least one security question from the user security questions and present the selected at least one security question via the interface; receive an answer to the at least one security question; apply a predictive model to determine a confidence score based on the identification information entered into the interface, the location input entered into the interface, and the answer to the at least one security question; upon determining that the confidence score exceeds a confidence score threshold, provide user location information, the user location information selected from the user location information stored in the data storage; and mask the provided user location information to conceal the user location information from display on the interface.

Embodiments of the present disclosure provide an artificial intelligence (AI) method for managing data access. The AI method comprises: receiving, by an AI engine, identification information entered into an interface for an online purchase displayed on a web page of a merchant; receiving, by the AI engine, at least one location input entered into the interface; selecting, by the AI engine, at least one security question from user security questions and presenting the selected at least one security question via the interface, the user security questions being stored in a data storage, and the data storage further containing user identification information, user location information, and answers to the user security questions; receiving, by the AI engine, an answer to the at least one security question; applying, by the AI engine, a predictive model to determine a confidence score based on the identification information entered into the interface, the location input entered into the interface, and the answer to the at least one security question; upon determining that the confidence score exceeds a confidence score threshold, providing, by the AI engine, user location information, the user location information selected from the user location information stored in the data storage; and masking, by the AI engine, the provided user location information to conceal the user location information from display on the interface. The AI engine is in data communication with the data storage through a communication interface, and the AI engine is coupled to an application programming interface (API) that enables transmission of real time data through the communication interface.

Embodiments of the present disclosure provides a non-transitory computer-accessible medium having stored thereon computer-executable instructions for managing data access. The computer-executable instructions may be executed by a computer arrangement comprising an artificial intelligence (AI) engine. The computer arrangement is configured to perform procedures comprising: receiving, by the AI engine, identification information entered into an interface for an online purchase displayed on a web page of a merchant; receiving, by the AI engine, at least one location input entered into the interface; selecting, by the AI engine, at least one security question from user security questions and presenting the selected at least one security question via the interface, the user security questions being stored in a data storage, and the data storage further containing user identification information, user location information, and answers to the user security questions; receiving, by the AI engine, an answer to the at least one security question; applying, by the AI engine, a predictive model to determine a confidence score based on the identification information entered into the interface, the location input entered into the interface, and the answer to the at least one security question; upon determining that the confidence score exceeds a confidence score threshold, providing, by the AI engine, user location information, the user location information selected from the user location information stored in the data storage; and masking, by the AI engine, the provided user location information to conceal the user location information from display on the interface. The AI engine is in data communication with the data storage through a communication interface, and the AI engine is coupled to an application programming interface (API) that enables transmission of real time data through the communication interface.

Further features of the disclosed methods and systems, and the advantages offered thereby, are explained in greater detail hereinafter with reference to specific example embodiments illustrated in the accompanying drawings.

BRIEF DESCRIPTION OF THE DRAWINGS

FIG. 6 depicts example security questions for managing data access utilizing AI technologies, according to embodiments of the present disclosure; and FIG. 7 depicts example user interfaces with masked location information for managing data access utilizing AI technologies, according to embodiments of the present disclosure.

DETAILED DESCRIPTION OF THE EMBODIMENTS

Figure 1:
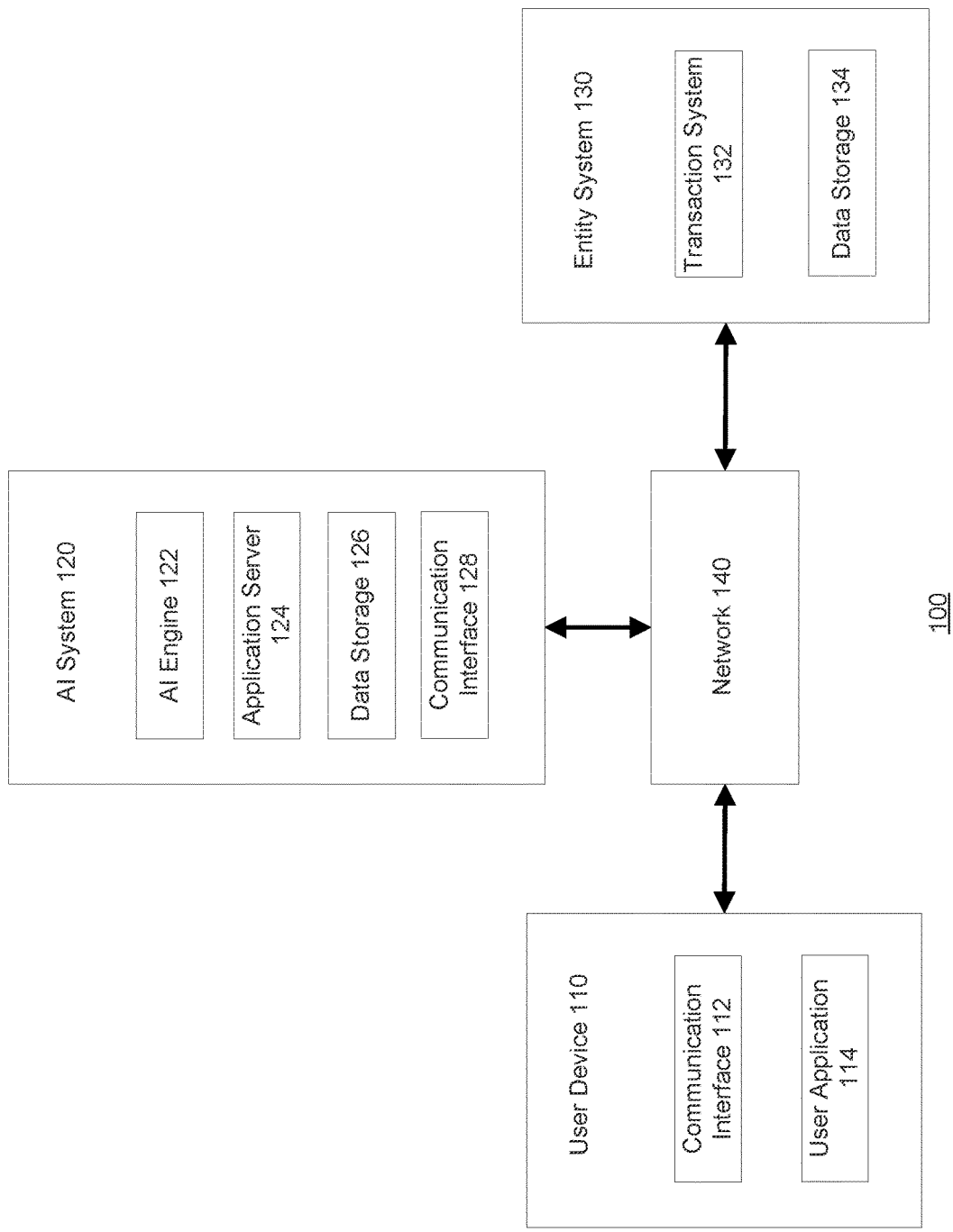
FIG. 1 depicts an example integrated AI system for managing data access, according to embodiments of the present disclosure.

The following description is intended to convey a thorough understanding of the embodiments described by providing a number of specific example embodiments and details involving AI-based systems and methods for managing data access. It should be appreciated, however, that the present disclosure is not limited to these specific embodiments and details, which are examples only. It is further understood that one ordinary skill in the art, in light of known systems and methods, would appreciate the use of the invention for its intended purposes and benefits in any number of alternative embodiments, depending on specific design and other needs. A financial institution and system supporting a financial institution are used as examples for the present disclosure. The present disclosure is not intended to be limited to financial transaction and/or online shopping. For example, the AI-based system may be utilized to facilitate other electronic transactions, including transferring rewards points, booking travel and restaurant reservations, registering and accessing services, and the like.

The present disclosure is not to be limited in terms of the particular embodiments described herein, which are intended as illustrations of various aspects. Many modifications and variations can be made without departing from its spirit and scope, as may be apparent. Functionally equivalent methods and apparatuses within the scope of the present disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

The below description, along with its associated embodiments, has been presented for purposes of illustration only. It is not exhaustive and does not limit the invention to the precise form disclosed. Those skilled in the art may appreciate from the below description that modifications and variations are possible in light of the below teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

In the present disclosure, various preferred embodiments have been described with references to the accompanying drawings. It may, however, be evident that various modifications and changes may be made thereto, and additional embodiments may be implemented, without departing from the broader scope of the invention as set forth in the claims that follow. The present disclosure and drawings are accordingly to be regarded as an illustrative rather than restrictive sense.

Various embodiments of the present disclosure provide AI-based systems and methods for managing data access that utilize enhanced AI technologies to facilitate and also automatically recommend personal data, such as email, address, and so forth. An AI-based system may be fully integrated with a financial account provider system and other third party systems such as a merchant system, a music sharing system, a streaming system, an online market system, a logistic system (e.g., package transportation and delivery), and the like. This unique integration facilitates the real time aggregation and evaluation of data from disparate sources including connected user devices and public data sources to automatically execute a conditional transaction.

One embodiment of the present disclosure relates to AI systems and methods for automatically providing personal data of a recipient when necessary to complete a transaction. For example, a delivery address for online shopping when a purchaser/shopper would like to send an item to someone (e.g., a gift or a surprise) but the user does not know the address of that person or only knows a portion of the address of that person. Based on an initial data input into the interface from the user (e.g., the recipient name, city or state in which the recipient lives), the AI system is configured to ask the user one or more security/verification questions related to the recipient (e.g., "Who is the recipient's favorite artist?" and "Where did the recipient attend college?"). The AI system then determines a confidence score based on such basic input and answers to the security questions to verify both the purchaser and the recipient, which allows for the confirmation that the purchaser is legitimate and not a bad actor and allows for a confirmation of the recipient's information and that the recipient is the person the purchaser intended.

Based on the confidence score, the AI system is configured to acquire the necessary personal data (e.g., a full delivery address) of the recipient from a database, and automatically fill out the necessary fields of the interface. The AI system may further mask the addresses entered into the shipping address fields such that the address of the recipient is not explicitly disclosed to the purchase and/or other parties, thus improving data security and the privacy of the recipient. This may be an option chosen by recipients, such that a recipient may choose whether a high or low confidence score should be applicable to his or her personal data. Recipients may also opt in to this AI system only for certain times (e.g., around birthdays, the holidays, or special events) when they are likely to receive gifts from many senders, and otherwise their personal data cannot be acquired by the AI system.

In one example, if a user conducting a transaction does not know the address of a recipient to who the user is shipping a purchased item, the AI system disclosed herein may allow the user to find out that address by providing some data. For example, the user may be prompted to input the recipient name (e.g., John Smith) on the interface. The user may further be prompted to input a city and state where the user knows the recipient's address is. At this point, the AI system may provide multiple "John Smiths" in this city and state. So the AI system may then provide the user one or more security questions which are relevant or no relevant to the recipient. The AI system instructs the user to answer the one or more security questions. The security questions may include, but not be limited to, "How long has John Smith lived at this address?" "Who else lives at this address?" and so forth. Based on answers to the one or more security questions, the AI system may identify an address for the matched "John Smith", from a database or data store, and automatically fill out the necessary fields of the interface. As result, the user who is buying a present for this "John Smith" can successfully surprise this person even without having to leave the interface to find out the address for the recipient. That is, the user can find out the recipient's address right in the flow of the shopping website.

An AI-based system disclosed herein may include an AI engine, an application server, a data storage, and a communication interface. The AI engine may be coupled to an application programming interface (API) that enables the transmission of real time data. The AI engine may receive real time data from one or more data sources. For example, the AI engine may receive real time data from a music sharing system, a merchant system, a streaming system, and/or public data systems. The received real time data may include voice data, geolocation data, and/or image data that may be used for generating security questions and/or answers to the security questions.

The AI engine may aggregate the received real time data by parsing and processing the received real time data across the one or more data sources, and may utilize AI technologies to parse and process input data to extract conditionally relevant meaning from the input data. Specifically, the AI engine may utilize AI technologies such as facial recognition, voice recognition and/or natural language processing to translate the received input data into a form that may be utilized by the AI engine to evaluate whether one or more of the security questions has been answered. For example, the AI engine may present a security question in audio format to a shopper and receive audio answer data from a connected user's device used by the shopper, and may utilize voice recognition and natural language processing technologies to process the input audio data to extract conditionally relevant meaning from the input audio data.

The AI engine may continuously evaluate the aggregated data to determine what follow-up security questions need to be asked and whether the one or more security questions have been answered correctly. The AI engine may utilize prioritized parameters (e.g., different weightings) to evaluate the received real time data to generate a confidence score that is utilized by the AI-based system to determine whether a transaction should be executed The determination that the one or more security questions have been answered correctly, may trigger the AI engine to call, an API coupled to the communication interface that communicates with an account provider system and/or a merchant system, to automatically facilitate recommending a mailing/shipping address. The communication interface associated with the application server may transmit, via a push notification gateway, a push notification to a user application on a user device (e.g., used by the purchaser) that establishes, via a network, a secure connection between the user device and the AI engine. The application server may transmit via the communication interface, a push notification to the user device, via the user application, including data indicative of a confidence score of the recommended address.

The AI engine may utilize machine learning and natural language processing to process and cluster the aggregated data to generate recommendations of security questions and/or addresses that may be evaluated to determine whether a transaction should be executed. These system generated recommendations may be stored in the data storage. Additionally, the application server may transmit, via the communication interface, a push notification to a user device, via a user application, which includes the generated recommendations.

The AI-based system may also facilitate multi-factor authentications including security questions. An initial security question may be selected and presented by the AI engine to the purchaser, a subsequent security question and/or more questions must then be answered by the purchaser for the transaction to be executed. The AI engine may continuously evaluate the aggregated data to determine whether a subsequent security question is required. For example, upon determining that the one or more security questions have been answered either correctly or incorrectly, the AI engine may request and receive geolocation data for a user device associated with the purchaser, and may utilize the received geolocation data to determine whether the user device is at a particular location specified in the transaction condition (e.g., the purchaser may be considered as a potential fraudster if the received geolocation data indicates that the purchaser is outside of United States), and upon detecting the user device is at the particular location, may automatically execute the associated transaction (e.g., filling out the necessary address fields and proceeding with the flow). The AI-based system may also include an authentication processor that may be connected to the AI engine. The authentication processor may be configured to confirm a location of a user device associated with the purchaser over a wireless connection by evaluating a unique user identification-secure link token pair.

In another embodiment, where an additional condition must be satisfied to trigger execution of a transaction (e.g., completing the flow for the purchase and shipping an item to the recipient), the recipient may set up a condition that if a user initiates a transaction at a particular time of day, a particular season of the year, or around when a particular event will be happening (e.g., the birthday of the recipient), the transaction will be allowed (e.g., the recipient is open for receiving items purchased by other users). An additional condition may be defined, tied to the geolocation of a user device associated with the purchaser, such that the transaction will only be executed if the purchaser is actually at a defined location or in a defined location range. The AI engine may evaluate geolocation data transmitted from the user device associated with the purchaser. If there is a match indicating that the purchaser is at the defined location or in the defined location range, the AI engine may send a request to a transaction system (e.g., the merchant system) to automatically execute the associated transaction, which may include an address of the recipient.

In another example, where an additional condition must be satisfied to trigger execution of a transaction, the recipient may set up a condition that if the purchaser is a family member of the recipient, a friend of the recipient, or a classmate of the recipient, the transaction would be allowed to proceed. An additional condition may be defined, tied to an item category, such that the transaction will only be executed if an item to be purchased is in the item category. As such, the AI engine may evaluate the item category associated with the item. If there is a match indicating that the item to be purchased is in the defined item category, the AI engine may send a request to a transaction system to automatically execute the associated conditional transaction, which may include an address of the recipient.

The unique integration of disparate systems provides a system that is able to facilitate the automatic execution of a transaction at an optimal instance when a condition has been satisfied as well as providing optimized and multi-factor electronic conditional transaction processing.

As described herein, the AI-based system may store an association between a user and security questions and/or predefined conditions. The association may be transmitted from the AI-based system to a financial institution system, or to other electronic transaction system such as a merchant system. The association may be stored on the system's backend (e.g., a server or other data storage device). For example the association may include a link between account identifiers (e.g., account holder names, account holder usernames, account numbers, and/or the like), mobile device identifiers (e.g., mobile device numbers, mobile device carriers, mobile device application identifiers, device UUIDs, device UDIDs), transaction cards (e.g., transaction card identifiers, transaction card numbers, and/or the like) of the users, and other demographic identifiers (e.g., geolocation, social security number, date of birth, email address, phone number, employee identification number, student identification number, profile picture, and/or the like). Accordingly, using the association, upon determining that a condition has occurred, the AI-based system may transmit a notification that suggests or automatically triggers the execution of the associated transaction.

Embodiments of the present disclosure may improve a user's experience by facilitating transactions even when the user lacks the recipient's personal data and may streamline transaction flow. For example, instead of pausing or cancelling a transaction because a user lacks a recipient's personal data, the transaction may be completed in an efficient, secure manner. Benefits to the recipient may include privacy protection while making it easier for the recipient to receive gifts from friends and acquaintances, without directly sharing their personal data.

In addition, the data security measures would reduce the risk of data breaches, which benefits the user, the merchant, the financial institution, and the recipient. Increased efficiency of the transaction may also benefit the financial institution by promoting the occurrences of transactions and making transactions easier to complete. For example, a transaction that would have been paused or halted due to a lack of personal data may be delayed or possibly never completed. The AI systems and methods disclosed herein allow for the secure, efficient completion of these transactions.

FIG. 1 depicts an integrated AI system 100 for managing data access according to an example embodiment. As shown in FIG. 1, the integrated AI system 100 may include one or more user devices 110, an AI-based system 120, and one or more entity systems 130 connected over one or more networks 140.

The user device 110, AI-based system 120, and entity system 130 may each include a network-enabled computer system and/or device. As referred to herein, a network-enabled computer system and/or device may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The network-enabled computer systems may execute one or more software applications to, for example, receive data as input from an entity accessing the network-enabled computer system, process received data, transmit data over a network, and receive data over a network.

The user device 110, AI-based system 120, and entity system 130 may each include at least one central processing unit (CPU), which may be configured to execute computer program instructions to perform various processes and methods. The at least one CPU may comprise several processors, a single processor, or a single device having multiple processors.

The user device 110, AI-based system 120, and entity system 130 may each include a data storage, including for example, random access memory (RAM) and read only memory (ROM), which may be configured to access and store data and information and computer program instructions. The data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel® file, Microsoft® Access® file, a solid state storage device, which may include an all flash array, a hybrid array, or a server-side product, enterprise storage, which may include online or cloud storage, or any other storage mechanism.

Although depicted as single elements, it should be appreciated that according to one or more embodiments, the user device 110, AI-based system 120, and entity system 130, may each comprise a plurality of user devices 110, AI-based systems 120, and entity systems 130. As shown in FIG. 1, the user device 110, AI-based system 120, and entity system 130 may each include various components. As used herein, the term "component" may be understood to refer to computer executable software, firmware, hardware, and/or various combinations thereof. It is noted there where a component is a software and/or firmware component, the component is configured to affect the hardware elements of an associated system. It is further noted that the components shown and described herein are intended as examples. The components may be combined, integrated, separated, or duplicated to support various applications. Also, a function described herein as being performed at a particular component may be performed at one or more other components and by one or more other devices instead of or in addition to the function performed at the particular component. Further, the components may be implemented across multiple devices or other components local or remote to one another. Additionally, the components may be moved from one device and added to another device, or may be included in both devices.

As depicted in FIG. 1, the user device 110 may be any device capable of communicating via, for example, Bluetooth technology, NFC technology, WiFi Direct technology, and/or the like. The user device 110 may be associated with a user and may be configured to execute various functions to transmit and receive user data (e.g., security questions, answers to security questions, card number, account type, account balance, account limits, budget data, recent transactions, and/or the like). For example, the user device 110 could be an iPhone, iPod, iPad, and/or Apple Watch from Apple® or other mobile device running Apple's iOS operating system, devices running Google's Android® operating system, including, for example, smartphones running the Android® operating system and other wearable mobile devices, such as Google Glass or Samsung Galaxy Gear Smartwatch, devices running Microsoft's Windows® Mobile operating system, and/or any other smartphone, smartwatch, tablet, or like device, which may include personal assistant devices incorporating systems, such as Alexa, Siri, Google Assistant, and Microsoft Cortana, including home assistant devices such as Amazon Echo, Google Home, and the like.

The user device 110 may include components to send and/or receive data for use in other components, such as a communication interface 112. The communication interface 112 may include various hardware and software components, such as, for example, a repeater, a microwave antenna, or another network access device capable of providing connectivity between network mediums. The communication interface 112 may also contain various software and/or hardware components to enable communication over the network 140. For example, the communication interface 112 may be capable of sending or receiving signals via the network 140. Moreover, the communication interface 112 may provide connectivity to one or more wired networks and may be capable of receiving signals on a first medium (such as a wired network) and transmitting the received signals on a second medium (such as a wireless network). One or more users may access the network 140 through one or more user devices 110 that may be communicatively coupled to the network 140.

A current location of the user device 110 may be determined using many different technologies such as GPS technology, Internet-based technology, etc., which may utilize location data. By way of example, location data may include, but is not limited to GPS data, assisted GPS data, IP address data, cell identification data, received signal strength indication (RSSI) data, wireless fingerprinting data, inertial sensor data (e.g., compass or magnetometer data, accelerometer data, and/or gyroscope data), barometer data, ultrasonic data (e.g., radio-frequency identification (RFID) data, near-field communication (NFC) data), Bluetooth data, and/or terrestrial transmitter data.

The user device 110 may also include various software components to facilitate the transaction processing, which may include account and payment operations, including an application processor (not shown in FIG. 1). For example, the user device 110 may include an operating system such as, for example, the iOS® operating system from Apple®, the Google® Android® operating system, and the Windows Mobile® operating system from Microsoft®. The user device 110 may also include, without limitation, software applications such as mobile banking applications and financial institution applications to facilitate transactions, an NFC application programming interface, and software to enable touch sensitive displays. User device manufacturers may provide software stacks or APIs which allow software applications to be written on top of the software stacks. For example, user device manufacturers may provide, without limitation, a card emulation API to enable NFC card emulation mode, a logic link control protocol (LLCP) API for peer-to-peer communication between user devices, a Bluetooth® API supporting BLE, and a real-time data (RTD) API and a NFC Data Exchange Format (NDEF) API for reading/writing.

The application processor may enable execution of software applications on the user device 110, which may include a user application 114. The user application may comprise instructions for execution on the user device 110. The user application 114 may include various user interfaces, which may leverage account data, user device data, transaction data, wireless data connection, over-the-air data connection, or other means of data transmission to allow user to set up transaction conditions that may be evaluated to automatically facilitate transactions.

The data used in the user application 114 may be transmitted, for example, from external data sources. The user application 114 may leverage information from public data sources, which may include traffic, weather, financial, legal data information and the like, as well information about an account or account holder, information about a merchant and/or other parties involved in a transaction, rewards information, promotional information, advertising information, and other useful information. The user application 114 may be integrated with or separate from a wallet application, which may be utilized to seamlessly facilitate transactions.

As depicted in FIG. 1, the AI-based system 120 may include an AI engine 122, an application server 124, a data storage 126, and a communication interface 128. The AI-based system 120 may include data and/or components, systems, and interfaces, including application programming interfaces (APIs) to enable the generation, transmission, and processing of data including digital authentication data.

The AI-based system 120 may access user or system defined transaction conditions to make or request a transaction. The transaction conditions may be defined by a user (e.g., a recipient or a purchaser). For example, a recipient may define a transaction condition that only a family member of the recipient can send a gift to the recipient, thus the address of the recipient would be concealed or inaccessible to users other than the family members of the recipient. Users may opt in to the system and have registered in advance with the AI-based system 120 to agree to or express interest in transaction involved the users. The transaction conditions may be stored in the entity system 130 and/or the AI-based system 120. The transaction conditions may be dynamically modified by the recipient through a user device associated with the recipient or the AI-based system 120.

The AI-based system 120 may have differentiated access to the entity system 130 and other third party systems, including public data source systems via private APIs. The AI-based system 120 may also have differentiated access to user devices (e.g., the user devices 110) via private device APIs. The AI-based system 120 may make calls to the private APIs utilizing a token to provide a secure communication channel between the AI-based system 120 and the entity system 130 and the other third party systems. The device APIs may also provide a secure communication between the user device 110 and the AI-based system 120.

The AI engine 122 may access user or system defined transaction conditions to make or request a transaction. The transaction conditions may be stored in the data storage 126. For example, a user may utilize the user application 114 to set up a condition.

The AI engine 122 may receive real time input data from one or more data sources associated with one or more transaction conditions, and may utilize AI technologies to parse and process the input data to extract conditionally relevant meaning from the input data. In this example, the AI engine 122 may receive audio data from the user of the user device 110, and may utilize voice recognition and natural language processing technologies to process the input audio data to extract conditionally relevant meaning from the data, which in this example would process and extract meaning from the audio data to determine whether what the user of the user device 110 said matches the answer to a security question.

Accordingly, the AI engine 122 may determine whether the one or more conditions is met or a confidence score exceeds a score threshold. Upon determining that the one or more transaction conditions has been met or the confidence score exceeds a score threshold, the AI engine 122 may send a request to a transaction system 132 of the entity system 130 to automatically execute the associated conditional transaction. The determination that the condition has been met or the confidence score exceeds a score threshold, may trigger the AI engine 122 to call, via an API coupled to the communication interface 128 that communicates with the entity system 130, to automatically facilitate the conditional transaction, filling out necessary address fields of personal data and proceeding with the transaction flow to complete the transaction.

The AI engine 122 may identify and receive related signals associated with real time input data from one or more data sources (e.g., a music sharing provider, a streaming provider) associated with one or more transaction conditions, and in some examples may perform this operation continuously. The AI engine 122 may utilize AI technologies to parse and process the input data to extract conditionally relevant meaning from the input data. The AI engine 122 may receive the input data that may be collected as a subscription to a stream of data or as a periodic polling of data. The AI engine 122 engine may iteratively collect the most recent data and compare it to the next most recent to determine if any data is new and accordingly need to be parsed and processed to extract conditionally relevant meaning. For example, the application server 124 coupled to the AI engine 122 may receive audio data collected from an audio input source, such as a microphone. The application server 124 may also periodically check and request data from an external data source, such as a weather application system.

The processed data may be aggregated across the one or more data sources. The AI engine 122 may continuously evaluate the aggregated data to determine whether the one or more conditions is met. To minimize system resources, the AI-based system 120 may store the compressed aggregated data in the data storage 126. The compressed aggregated data may include the associated conditionally relevant meaning verification and associated metadata necessary to establish proof of occurrence of the condition, rather than the raw received input data. Specifically, the AI-based system 120 may automatically determine whether data is consequential by evaluating whether the data is pertinent to determining whether a condition has been met and/or is associated with data that does not satisfy a condition. Inconsequential data may be purged by the AI-based system 120 to save storage space. Consequential data may include data of previously processed transactions that may be utilized to predict a likelihood of future transactions. As such, this data that surrounds transactions (in time), which may be inferred to be consequential based on patterns, may also be stored in the data store.

Upon determining that the one or more transaction conditions has been met, the AI engine 122 may notify the user or send a request to the transaction system 132 of the entity system 130 to automatically execute the associated conditional transaction. The AI engine 122 may transmit via the communication interface 128 a push notification to the user device 110 via the user application 114. The push notification may include data indicative the executed conditional transaction. The AI engine 122 may generate an audit log that records executed conditional transactions.

The entity system 130 may include systems associated with, for example, a banking service company such as Capital One®, Bank of America®, Citibank®, Wells Fargo®, Sun Trust®, various community banks, and the like, as well as a number of other financial institutions such as Visa®, MasterCard®, and American Express® that issue credit and/or debit cards, for example, as transaction cards. The entity system 130 further include systems associated with a merchant from which a user purchases items, a streaming providers from which some security questions are generated, and/or an art website with which users may be registered and some security questions related to the users may be generated. The entity system 130 may include and/or be connected to one or more computer systems and networks to process transactions. The entity system 130 may include systems associated with financial institutions that issue transaction cards, including dynamic transaction cards, and maintains a contract with card-holders for repayment. In various embodiments, the entity system 130 may issue credit, debit, and/or stored value account. The entity system 130 may include, by way of example and not limitation, depository institutions (e.g., banks, credit unions, building societies, trust companies, mortgage loan companies, pre-paid gift cards or credit cards, etc.), contractual institutions (e.g., insurance companies, pension funds, mutual funds, etc.), investment institutions (e.g., investment banks, underwriters, brokerage funds, etc.), and other non-bank financial institutions (e.g., pawn shops or brokers, cashier's check issuers, insurance firms, check-cashing locations, payday lending, currency exchanges, microloan organizations, crowd-funding or crowd-sourcing entities, third-party payment processors, etc.).

The entity system 130 may include a transaction system 132 and a data storage 134. The transaction system 132 may include various hardware and software components to communicate between a merchant system, an account provider system, and/or a user device to process a transaction, such as money transfer. The data storage 134 may store data associated with an accounts of connected users (e.g., card number, account type, account balance, account limits, budget data, recent transactions, pairing data such as time and date of pairing with a mobile device, and the like) and account holder data (e.g., account holder name, address, billing address, phone number(s), email address, demographic data, and the like).

The network 140 may be one or more of a wireless network, a wired network or any combination of wireless network and wired network. Network 140 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g, a Bluetooth network, or any other wired or wireless network for transmitting and receiving a data signal.

In addition, the network 140 may include, without limitation, telephone lines, fiber optics, IEEE Ethernet 902.3, a wide area network ("WAN"), a local area network ("LAN"), a wireless personal area network ("WPAN"), a wide body area network ("WBAN") or a global network such as the Internet. Also network 140 may support an Internet network, a wireless communication network, a cellular network, or the like, or any combination thereof. Network 140 may further include one network, or any number of the example types of networks mentioned above, operating as a stand-alone network or in cooperation with each other. Network 140 may utilize one or more protocols of one or more network elements to which they are communicatively coupled. Network 140 may translate to or from other protocols to one or more protocols of network devices. Although network 140 is depicted as a single network, it should be appreciated that according to one or more embodiments, network 140 may comprise a plurality of interconnected networks, such as, for example, the Internet, a service provider's network, a cable television network, corporate networks, and home networks.

Figure 2:
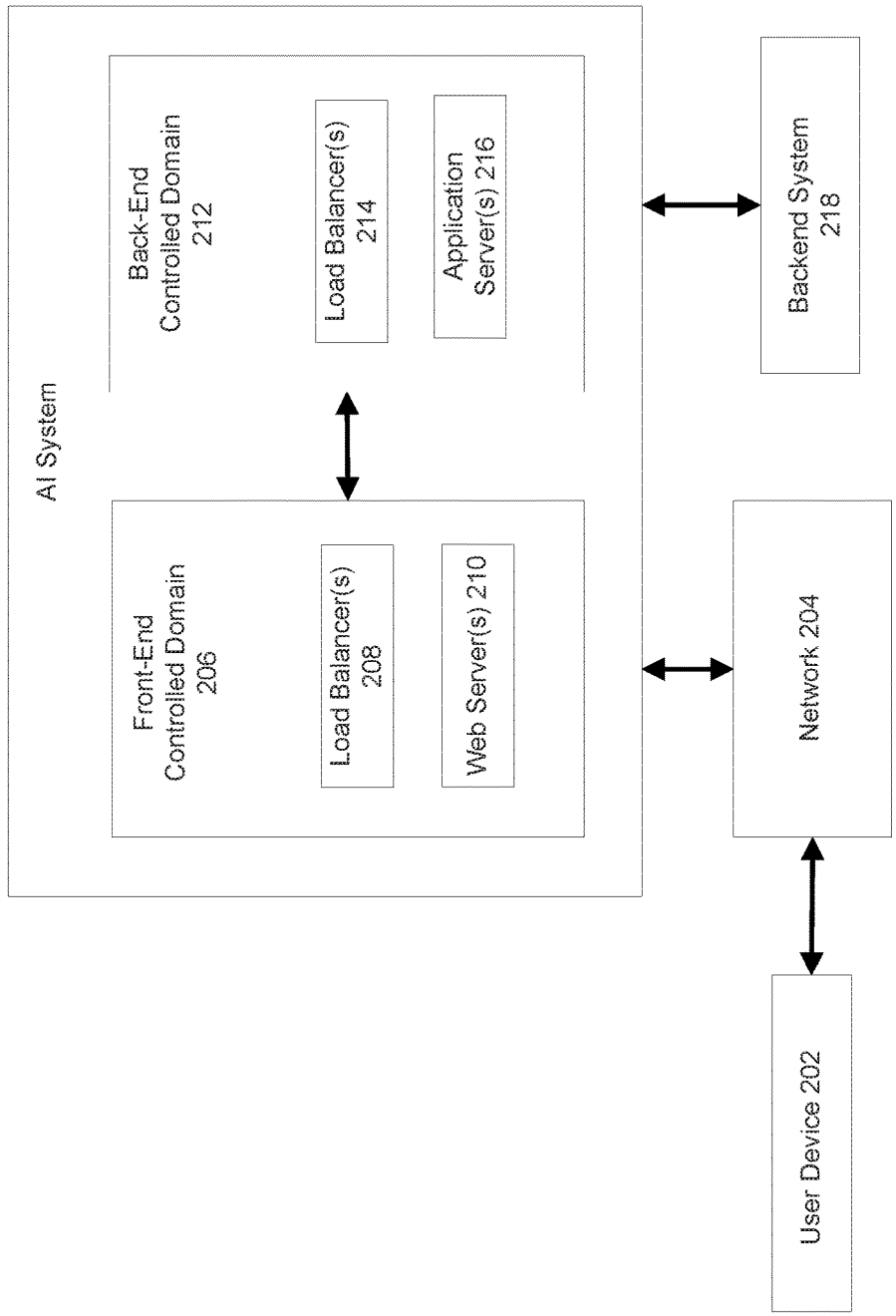
FIG. 2 depicts an example AI system for managing data access, according to embodiments of the present disclosure.

Referring to FIG. 2, an example AI system 200 may include an AI-based system that facilitates conditional electronic transaction processing. The example system 200 may include a user device 202, which may be similar to the user device 110, a network 204, which may be similar to the network 140, a frontend controlled domain 206, a backend controlled domain 212, and a backend system 218. The frontend controlled domain 206 may include one or more load balancers 208 and one or more web servers 210. The backend controlled domain 212 may include one or more load balancers 214 and one or more application servers 216.

The user device 202 may be a network-enabled computer. As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 200 may execute one or more software applications to enable, for example, network communications.

The user device 202 may include an iPhone®, iPod®, iPad®, and/or Apple Watch® from Apple® or any other mobile device running Apple's iOS® operating system, any device running Google's Android® operating system, including for example, Google's wearable device, Google Glass®, any device running Microsoft's Windows® Mobile operating system, and/or any other smartphone or like wearable mobile device.

The network 204 may be one or more of a wireless network, a wired network, or any combination of a wireless network and a wired network. For example, the network 204 may include one or more of a fiber optics network, a passive optical network, a cable network, an Internet network, a satellite network, a wireless LAN, a Global System for Mobile Communication (GSM), a Personal Communication Service (PCS), a personal area network, (PAN), D-AMPS, Wi-Fi, fixed wireless data, IEEE 802.11b, 802.15.1, 802.11n, and 802.11g or any other wired or wireless network for transmitting and receiving a data signal.

In addition, the network 204 may include, without limitation, telephone lines, fiber optics, IEEE Ethernet 902.3, a wide area network (WAN), a local area network (LAN), a wide body area network ("WBAN") or a global network such as the Internet. Also, the network 204 may support an Internet network, a wireless communication network, a cellular network, or the like, or any combination thereof. The network 204 may further include one network, or any number of example types of networks mentioned above, operating as a stand-alone network or in cooperation with each other. The network 204 may utilize one or more protocols of one or more network elements to which they are communicatively coupled. The Network 204 may translate to or from other protocols to one or more protocols of network devices. Although the network 204 is depicted as a single network, it should be appreciated that according to one or more embodiments, the network 204 may comprise a plurality of interconnected networks, such as, for example, the Internet, a service provider's network, a cable television network, corporate networks, and home networks.

The frontend controlled domain 206 may be implemented to provide security for the backend system 218. The load balancer(s) 208 may distribute workloads across multiple computing resources, such as, for example computers, a computer cluster, network links, central processing units or disk drives. In various embodiments, the load balancer(s) 208 may distribute workloads across, for example, the web server(s) 210 and/or the backend system 218. Load balancing aims to optimize resource use, maximize throughput, minimize response time, and avoid overload of any one of the resources. Using multiple components with load balancing instead of a single component may increase reliability through redundancy. Load balancing is usually provided by dedicated software or hardware, such as a multilayer switch or a Domain Name System (DNS) server process.

The load balancer(s) 208 may include software monitoring a port where external clients, such as, for example, the user device 202, connect to access various services of a financial institution, for example. The load balancer(s) 208 may forward requests to one of the web servers 210 and/or the backend system 218, which may then reply to the load balancer 208. This may allow the load balancer(s) 208 to reply to the user device 202 without the user device 202 ever knowing about the internal separation of functions. It also may prevent user devices from contacting backend servers directly, which may have security benefits by hiding the structure of the internal network and preventing attacks on the backend system 218 or unrelated services running on other ports, for example.

A variety of scheduling algorithms may be used by the load balancer(s) 208 to determine which backend server should receive a request. Simple algorithms may include, for example, random choice or round robin. The load balancer(s) 208 also may account for additional factors, such as a server's reported load, recent response times, up/down status (determined by a monitoring poll of some kind), number of active connections, geographic location, capabilities, or how much traffic it has recently been assigned.

The load balancer(s) 208 may be implemented in hardware and/or software. The load balancer(s) 208 may implement numerous features, including, without limitation: asymmetric loading; priority activation: SSL Offload and Acceleration; Distributed Denial of Service (DDoS) attack protection; HTTP/HTTPS compression; TCP offloading; TCP buffering; direct server return; health checking; HTTP/HTTPS caching; content filtering; HTTP/HTTPS security; priority queuing; rate shaping; content-aware switching; client authentication; programmatic traffic manipulation; firewall; and intrusion prevention systems.

The web server(s) 210 may include hardware (e.g., one or more computers) and/or software (e.g., one or more applications) that deliver web content that can be accessed by, for example a client device (e.g., the user device 202) through a network (e.g., the network 204), such as the Internet. In various examples, the web server(s) 210, may deliver web pages, relating to, for example, online banking applications and the like, to clients (e.g., the user device 202). The web server(s) 210 may use, for example, a hypertext transfer protocol (HTTP/HTTPS or sHTTP) to communicate with the user device 202. The web pages delivered to the user device 202 may include, for example, HTML documents, which may include images, style sheets and scripts in addition to text content.

A user agent, such as, for example, a web browser, web crawler, or native mobile application, may initiate communications by making a request for a specific resource using HTTP/HTTPS and the web server(s) 210 may respond with the content of that resource or an error message if unable to do so. The resource may be, for example a file on stored on the backend system 218. The web server(s) 210 also may enable or facilitate receiving content from the user device 202 so the user device 202 may be able to, for example, submit web forms, including uploading of files.

The web server(s) 210 may also support server side scripting using, for example, Active Server Pages (ASP), PHP, or other scripting languages. Accordingly, the behavior of the web server(s) 210 can be scripted in separate files, while the actual server software remains unchanged.

The load balancers 214 may be similar to load balancers 208 as described above.

The application server(s) 216 may be similar to the application server 124, as described above and may include hardware and/or software that is dedicated to the efficient execution of procedures (e.g., programs, routines, scripts) for supporting its applied applications. The application server(s) 216 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Also, the application server(s) 216 may act as a set of components accessible to, for example, a financial institution, or other entity implementing the example system 200, through an API defined by the platform itself. For web applications, these components may be performed in, for example, the same running environment as the web server(s) 210. The application server(s) 216 may support the construction of dynamic pages. The application server(s) 216 also may implement services, such as, for example, clustering, failover, and load balancing. In various embodiments, where the application server(s) 216 are Java application servers, the application server(s) 216 may behave like an extended virtual machine for running applications, transparently handling connections to databases associated with the backend system 218 on one side, and connections to the web client (e.g., user device 202) on the other side.

The backend system 218 may include hardware and/or software that enables the backend services of, for example, a financial institution, a merchant, streaming provider or other entity that maintains a distributed system similar to the example system 200. For example, the backend system 218 may include, a system of record, online banking applications, encryption applications, BLE/Bluetooth connection platforms, a rewards platform, a payments platform, a lending platform including the various services associated with (for example, auto and home lending platforms), a statement processing platform, one or more platforms that provide mobile services, one or more platforms that provide online services, a card provisioning platform, a general ledger system, and/or a location system, which may include additional capabilities, such as transaction card data generation, transaction processing, and/or transmission of account and/or transaction data. The backend system 218 may be associated with various databases, including account databases that maintain, for example, cardholder information (e.g., demographic data, credit data, cardholder profile data, and the like), transaction card databases that maintain transaction card data (e.g., transaction history, account balance, spending limit, budget categories, budget spending, budget limits, and the like), connection information (e.g., public/private key pairs, UUIDs, device identifiers, and the like) and the like. The backend system 218 may also be associated with one or more servers that enable the various services provided by the example system 200. The backend system 218 may enable an online registry system to implement various functions associated with generating an enhanced distributed online registry that determines and provides registry items that are compatible with a customer acquisition.

Figure 3:
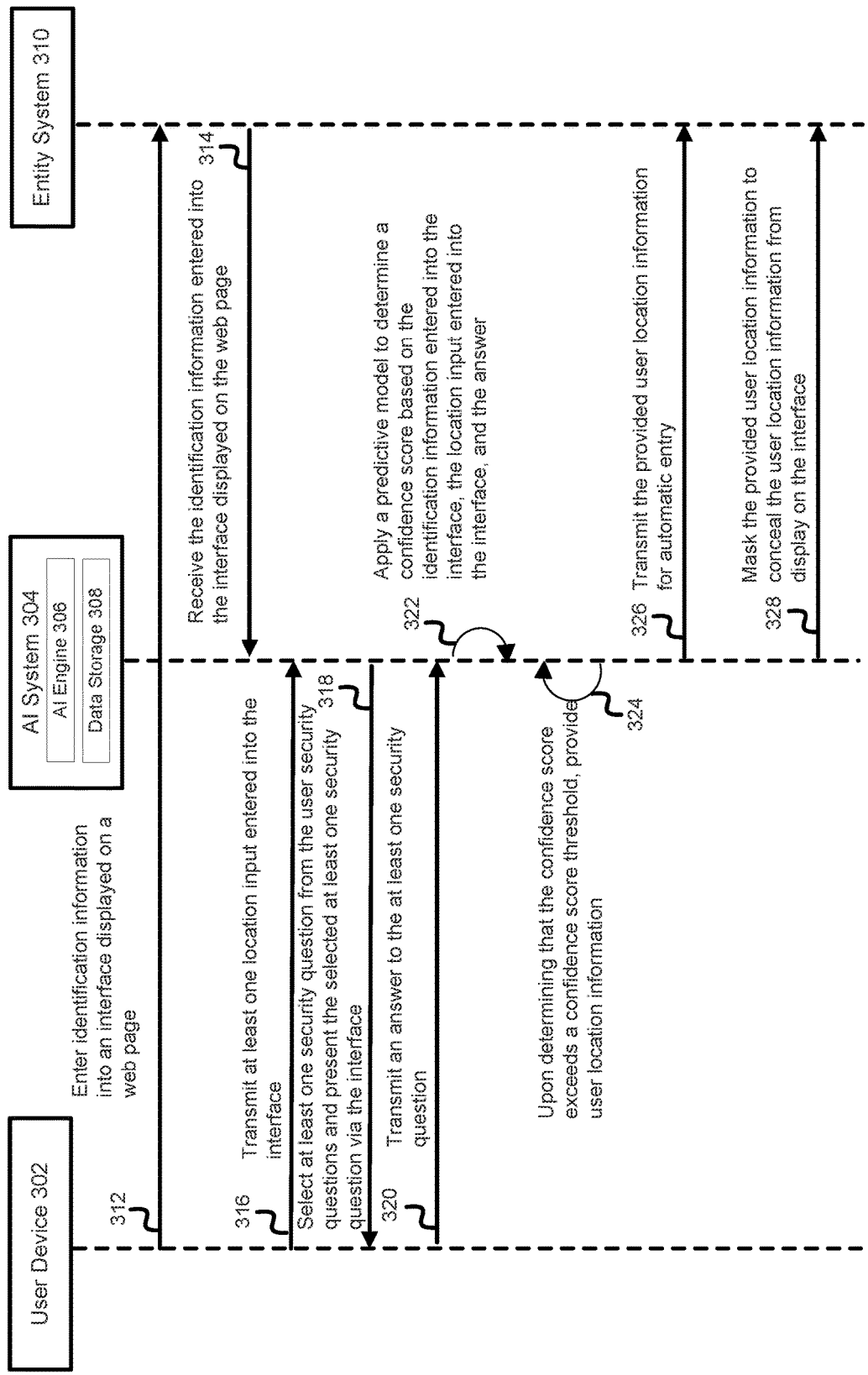
FIG. 3 illustrates an example sequence process for managing data access utilizing AI technologies, according to embodiments of the present disclosure.

FIG. 3 illustrates a sequence chart of a system and process 300 for managing data access according to example embodiments. The process 300 may recite a user device 302, an AI system 304, an AI engine 306, a data storage 308, and an entity system 310.

The user device 302 (similar to the user device 110) may be associated with any party and/or account holder, including a credit card holder, debit card holder, stored value card holder and the like.

The AI system 304 including the AI engine 306 and data storage 308 may be, for example, associated with a financial institution or bank that holds the contract for providing payment processing services. The AI system 304 including the AI engine 306 and data storage 308 may also be associated with a merchant or other third parties.

The entity system 310 may be associated with any transaction data management entity that accepts payment from a cardholder in exchange for an item that is sold for example, online. The entity system 310 may be any retailer, service provider, business entity, or individual that accepts payments. The entity system 310 may also be associated with other third parties such as a streaming content provider and/or a music sharing provider. One or more security questions used by the AI system 304 may be generated based on information/data provided by the entity system 310.

In step 312, a user may use the user device 302 to conduct a transaction on a website associated with the entity system 310. The user may want to purchase one or more items for a recipient whose address the user does not know. On an interface displayed on a web page of the website, the user may enter via the user device 302 identification information of the recipient into the interface for the online purchase.

The identification information of the recipient may include the first name and last name of the recipient.

In step 314, the AI system may receive from the entity system 310 the identification information entered into the interface for the online purchase displayed on the web page of the website. The AI system may store the identification information in the data storage 308.

In step 316, the user may transmit via the user device 302 to the AI system 304 at least one location input entered into the interface. The user may know a city, a state and/or a zip code in which the recipient lives. The at least one location input may include the city, the state and/or the zip code.

In step 318, the AI engine 306 may select at least one security question from the user security questions and present the selected at least one security question via the interface to the user. The at least one security question is selected from the user security questions based on the identification information and/or the at least one location input that have been entered into the interface. The user security questions may be stored in the data storage 308, and may be created based on personal data and information registered with the AI system by the recipient. The user security questions may also be created based on personal data and information relevant to the recipient that is imported and/or integrated from the entity system 310 or other third parties (a music sharing provider and a streaming content provider). For example, the recipient may shop on the website and register his/her information with the entity system 310. The recipient may listen to music played on a website associated with the music sharing provider and register his/her information with the music sharing provider. The recipient may watch streaming contents supplied by the streaming provider and register his/her information with the streaming provider.

The at least one security question may include, but not limited to, (1) what is the mother's maiden name of the recipient? (2) how long has the recipient lived at this address? (3) who else lives at this specific address? (4) what part of the city does the recipient live in? (5) what is a favor artist of the recipient? (6) who are family members of the recipient? and (7) what song is the recipient always playing?.

In step 320, the user may transmit via the user device 302 to the AI engine 306 an answer to the at least one security question. The user may answer the at least one security question completely wrong, partially wrong, completely correct or partially correct.

In step 322, the AI engine 306 may apply a predictive model to determine a confidence score based on the identification information entered into the interface, the location input entered into the interface, and the answer to the at least one security question. Specifically, the AI engine may determine the confidence score based on (1) the name of the recipient entered into the interface, (2) the at least one selected from the group of the city name, the state name, the zip code, and the street name entered into the interface, and (3) the answer to the at least one security question.

The predicative model may include one or more machine learning (ML) models, such as hidden Markov models, Gaussian mixture models, pattern matching algorithms, neural networks, matrix representation, vector quantization and decision trees. In this example, the AI engine may use any suitable ML models or algorithms to process and analyze the data for determining the confidence score. The various ML models may comprise supervised learning (e.g., classification and regression), unsupervised learning (e.g., pattern recolonization and cluster analysis), semi-supervised learning, reinforcement learning, self-learning, feature learning (e.g., sparse dictionary learning), associate rules and anomaly detection. The various ML models can utilize various neural network, such as convolutional neural networks ("CNNs") or recurrent neural networks ("RNNs").

A CNN can include one or more convolutional layers (e.g., often with a subsampling step) and then followed by one or more fully connected layers as in a standard multi-layer neural network. CNNs can utilize local connections, and can have tied weights followed by some form of pooling which can result in translation invariant features. A RNN is a class of artificial neural network where connections between nodes form a directed graph along a sequence. This facilitates the determination of temporal dynamic behavior for a time sequence. Unlike feedforward neural networks, RNNs can use their internal state (e.g., memory) to process sequences of inputs. A RNN can generally refer to two broad classes of networks with a similar general structure, where one is finite impulse and the other is infinite impulse. Both classes of networks exhibit temporal dynamic behavior. A finite impulse recurrent network can be, or can include, a directed acyclic graph that can be unrolled and replaced with a strictly feedforward neural network, while an infinite impulse recurrent network can be, or can include, a directed cyclic graph that may not be unrolled. Both finite impulse and infinite impulse recurrent networks can have additional stored state, and the storage can be under the direct control of the neural network. The storage can also be replaced by another network or graph, which can incorporate time delays or can have feedback loops. Such controlled states can be referred to as gated state or gated memory, and can be part of long short-term memory networks ("LSTMs") and gated recurrent units.

RNNs can be similar to a network of neuron-like nodes organized into successive "layers," each node in a given layer being connected with a directed e.g., (one-way) connection to every other node in the next successive layer. Each node (e.g., neuron) can have a time-varying real-valued activation. Each connection (e.g., synapse) can have a modifiable real-valued weight. Nodes can either be (i) input nodes (e.g., receiving data from outside the network), (ii) output nodes (e.g., yielding results), or (iii) hidden nodes (e.g., that can modify the data en route from input to output). RNNs can accept an input vector x and give an output vector y. However, the output vectors are based not only by the input just provided in, but also on the entire history of inputs that have been provided in in the past.

For supervised learning in discrete time settings, sequences of real-valued input vectors can arrive at the input nodes, one vector at a time. At any given time step, each non-input unit can compute its current activation (e.g., result) as a nonlinear function of the weighted sum of the activations of all units that connect to it. Supervisor-given target activations can be supplied for some output units at certain time steps. For example, if the input sequence is a speech signal corresponding to a spoken digit, the final target output at the end of the sequence can be a label classifying the digit. In reinforcement learning settings, no teacher provides target signals. Instead, a fitness function, or reward function, can be used to evaluate the RNNs performance, which can influence its input stream through output units connected to actuators that can affect the environment. Each sequence can produce an error as the sum of the deviations of all target signals from the corresponding activations computed by the network. For a training set of numerous sequences, the total error can be the sum of the errors of all individual sequences.

The models described herein may be trained on one or more training datasets, each of which may comprise one or more types of data. In some examples, the training datasets may comprise previously-collected data, such as data collected from previous uses of the same type of systems described herein and data collected from different types of systems. In other examples, the training datasets may comprise continuously-collected data based on the current operation of the instant system and continuously-collected data from the operation of other systems. In some examples, the training dataset may include anticipated data, such as the anticipated future workloads, currently scheduled workloads, and planned future workloads, for the instant system and/or other systems. In other examples, the training datasets can include previous predictions for the instant system and other types of system, and may further include results data indicative of the accuracy of the previous predictions. In accordance with these examples, the predictive models described herein may be training prior to use and the training may continue with updated data sets that reflect additional information.

In step 324, upon determining that the confidence score exceeds a first confidence score threshold, the AI engine 306 may provide user location information (i.e., the recipient's full address). The user location information is selected from the user location information stored in the data storage 308. When the confidence score is determined to exceed the first confidence score threshold, the AI engine may determine the recipient for whom the user intends to purchase the item matches a recipient stored in the data storage 308. As such, the full address associated with the recipient stored in the data storage 308 is selected and provided by the AI engine.

In step 326, the AI engine 306 may transmit the provided user location information for entry into the interface. The AI engine 306 or the entity system 310 may automatically complete necessary fields of the address fields displayed on the interface based on the provided user location information. For example, the AI engine 306 may automatically fill out the street name and number, the city, the state and/or the zip code.

In step 328, the AI engine 306 may mask the provided user location information to conceal the user location information from display on the interface. For example, the shipping address fields are not explicitly displayed on the webpage to the user. Whether the provided user location information is masked may be determined by the AI engine based on the confidence score. For example, when the confidence score is greater than the first confidence score threshold but less than a second confidence score threshold where the second confidence score threshold is greater than the first confidence score threshold, the AI engine may be configured to mask the provided user location information. Whether the provided user location information is masked may also be determined by the AI engine based on conditions defined by the recipient. For example, the recipient may not want his/her address to be explicitly displayed to a person who is not a family member or a close friend of the recipient.

Figure 4:
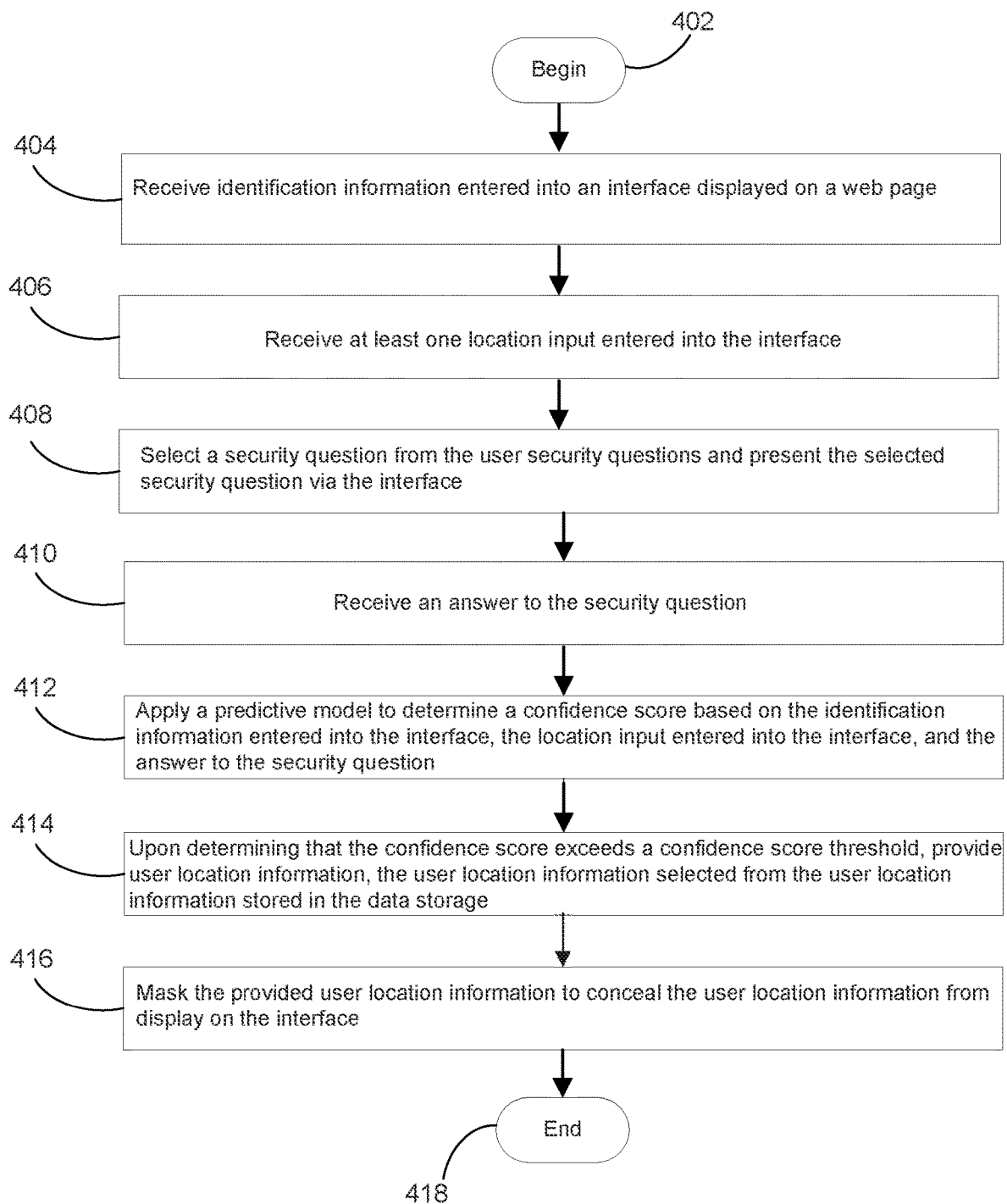
FIG. 4 depicts an example method for managing data access utilizing AI technologies, according to embodiments of the present disclosure.

FIG. 4 illustrates a method 400 for managing data access utilizing AI technologies according to example embodiments. The method 400 may begin at block 402. At block 404, the AI engine (e.g. AI engine 122) may receive identification information entered into an interface for an online purchase displayed on a web page. As described above, a user may use the user device 110 to conduct an online shopping on a website associated with the entity system 130. The user may want to purchase one or more items for a recipient whose address the user does not know. On an interface displayed on a web page, the user may enter via the user device 110 identification information of the recipient into the interface for the online purchase that may be received by the AI engine 122. The identification information of the recipient may include the first name and last name of the recipient.

According to block 406, the AI engine 122 may receive at least one location input entered into the interface. The user may transmit via the user device 110 to the AI system 120 at least one location input entered into the interface. The user may know a city, a state and/or a zip code in which the recipient lives. The at least one location input may include the city, the state and/or the zip code. The AI engine 122 may store the at least one location input in the data storage 126 of the AI-based system 120 at block 406, and/or may also be stored within an external data server. A secure connection may be made between the user device 110, the AI-based system 120, and/or the entity system 130 to transmit the identification information and at least one location to the user device 110, AI-based system 120, and/or entity system 130, respectively. User identification information of registered users may also be stored in the data storage 126, in the user application 114, and/or within the external data server. The identification information may include, but not limited to, user name, user logging ID, user logging password, home address, email, and home/mobile phone number.

At block 408, the AI engine 122 may select at least one security question from the user security questions and present the selected at least one security question via the interface. As described above, the user security questions may be generated by the AI engine 122 based on real time input data securely transmitted from one or more data sources associated the entity system 130 and other third parties such as a music sharing provide and a streaming content provider. The one or more data sources may include public data sources and financial accounts relevant to the recipient. The input data may include images video, audio, text, geolocation location data, GPS location data from a user device associated with the recipient, which may include place data such as restaurant, store, airport, and the like.

The AI engine 122 may collect data from individual or joint users through real time data input sources, like those described above. Users may utilize a user application that is associated with the application server 124, like the user application 114 to consider the level of information they are willing to share with the system. The system may include the data sources, which may include a user device and an account provider system for which the user has an account associated with a financial institution. For example, a condition may be configured to include permission controls which may facilitate a user to opt in or opt out of the sharing of associated user data. A user may be prompted via a notification on the user application 114 to grant or decline permission to share the necessary data to be evaluated for the associated conditional transaction processing. The data storage may contain an indicator for each user indicating whether the user opts out or opts in for disclosing an address of the user. The indicator may indicate that the user opts out or opts in for disclosing the address of the user for a specified period of time (e.g., 3 months) or specified events (e.g., birthday, wedding, and/or graduation). The necessary data may include voice, facial recognition, location, device usage data, and the like. The at least one security question is selected from the user security questions based on the identification information and/or the at least one location input that have been entered into the interface.

In block 410, the AI engine 122 may receive an answer to the at least one security question from the user via the user device 110. In the block 408, the AI engine 122 may transmit the at least one security question to the user device 110. The user may answer the at least one security question and transmit the answer via the user device 110 to the AI engine 122.

In some embodiments, the AI engine 122 may transmit the at least one security question in an audio, video and/or text format to the user device 110. The user may answer the at least one security question in an audio, video and/or text format. The AI engine 122 may utilize AI technologies to parse and process the at least one security question and answer to extract conditionally relevant meaning. For example, the AI engine 122 may initially perform signal acquisition and filtering of a signal generated from the at least one security question and answer, which may be followed by further signal compression and decompression, such that the at least one security question and answer is in format of which the AI engine 122 may extract conditionally relevant meaning. Specifically, the AI engine 122 may utilize AI technologies such as facial recognition, voice recognition and/or natural language processing to translate the received input data into a form that may be utilized by AI engine 122 to evaluate whether one or more of the defined conditions have been met. For example, the AI engine 122 may utilize voice recognition and natural language processing technologies to extract meaning from the voice data included in the answer. Specifically the voice recognition and natural language technologies may be utilized to process the input voice data, such that the AI engine 122 may utilize a pattern matching algorithm to compare the AI-processed input voice data to the defined condition, to determine when the AI-processed input data matches the defined condition, to assess whether the answer matches the real answer to the at least one security question stored in the data storage 126.

Alternatively, the AI engine 122 may utilize AI technologies to parse and process the answer including audio, video and text to extract conditionally relevant meaning and aggregate them to verify whether a condition has been met. For example, facial recognition technologies may be utilized to process image data of an image included in the answer, which may be taken from a camera on a user's mobile device (e.g., the user device 110) to detect a facial expression of the user. Additionally, voice recognition and natural language processing technologies may also be utilized to process any received audio data of the user included in the answer. Geolocation data may also be processed to detect whether the user is in a predefined location range (e.g., inside the United States). Accordingly, the AI engine 122 may utilize a pattern matching algorithm to aggregate and compare the AI-processed input image, voice data, and geolocation data respectively to the defined condition, to determine when the AI-processed input data matches the defined condition, to assess whether the answer matches the real answer to the at least one security question stored in the data storage 126.

In some embodiments, the at least one security question may be presented in a first text message through the communication interface to a user device associated with the user; and the answer to the at least one security question may be received in a second text message through the communication interface from the user device.

In some embodiments, the AI system may generate a graphical user interface (GUI) to be displayed on the web page of the merchant, and present the at least one security question on the GUI. The AI system may receive the answer to the at least one security question from the GUI, wherein the answer to the at least one security question is entered into the GUI.

In some embodiments, the AI system may determine a relationship between the user of the online purchase and the recipient of the online purchase based on the answer to the at least one security question; and present one or more follow-up security questions related to the recipient to the purchaser based on the relationship.

At block 412, the AI engine 122 may apply a predictive model to determine a confidence score based on the identification information entered into the interface, the location input entered into the interface, and the answer to the at least one security question. The predictive model may include at least one selected from the group of (1) a hidden Markov model, (2) a Gaussian mixture model, (3) a pattern matching algorithm, (4) a neural network, (5) a matrix representation, (6) a vector quantization and decision tree, (7) a supervised learning model, (8) an unsupervised learning model, (9) a semi-supervised learning model, (10) a reinforcement learning model, (11) a self-learning model, and (12) a feature learning model.

The algorithm may utilize specific calculations that utilize parameters (e.g., weightings) to prioritize the input data in generating the confidence score. For example, the identification information (e.g., first name and last name of the recipient) entered into the interface may be assigned a smaller parameter (e.g., 0.1 on a scale of 0-1), the location input (e.g., city and/or state) entered into the interface may be assigned a medium parameter (e.g., 0.3 on the scale of 0-1), and the answer to the at least one security question may be assigned a larger parameter (e.g., 0.6 on the scale of 0-1). The AI engine 122 may continuously evaluate the aggregated data to determine a new confidence score. For example, when a follow-up security question is asked, the confidence score may be recalculated based on the answer to the follow-up security question to arrive at the new confidence score.

The confidence score may be determined by (1) comparing the user identification information in the data storage with a name of a recipient entered into the interface, (2) comparing the user location information in the data storage with the at least one selected from the group of a city name, a state name, a zip code, and a street name entered into the interface, and (3) comparing the answer to the at least one security question with the answers to the user security questions in the data storage.

At block 414, upon determining that the confidence score exceeds a confidence score threshold, the AI engine 122 may provide user location information. When the confidence score is determined to exceed the confidence score threshold, the AI engine may determine the recipient to whom the user intends to ship the item matches a recipient stored in the data storage 126. As such, the full address associated with the recipient stored in the data storage 126 is selected and provided by the AI engine. The user location information is selected from the user location information stored in the data storage 126. The user location information is at least one selected from the group of an electronic address and a physical address.

At block 416, the AI engine 122 may mask the provided user location information to conceal the user location information from display on the interface. The AI engine 122 may transmit the provided user location information for being entered into the interface. The AI engine 122 or the entity system 130 may automatically complete necessary fields of the address fields displayed on the interface based on the provided user location information. For example, the AI engine 122 may automatically fill out the street name and number, the city, the state and/or the zip code. After completing the address on the interface, the AI engine 122 may mask the provided user location information to conceal the user location information from display on the interface. For example, the address fields are not explicitly displayed on the webpage to the user. Whether the provided user location information is masked may be determined by the AI engine based on conditions defined by the recipient. For example, the recipient may not want his/her address to be explicitly displayed to a person who just knows the recipient, for example, through a social network.

The process may end at block 418. Upon completion of the transaction, the completed transaction may be recorded and stored by the AI-based system 120 for further reference or evaluation in the future. The above process can be repeated.

In some embodiments, the AI engine may generate a notification based on the determined confidence score. The generated notification may indicate a degree to which how accurate the provided user location information matches an actual address of a recipient. The AI engine may transmit through the communication interface the generated notification to the user device associated with the user.

In some embodiments, when the determined confidence score is less than the confidence score threshold, the AI engine may be configured to trigger a recommendation for an insurance policy placed on the online purchase, such that the user may be compensated if the purchase is delivered to an incorrect address.

Figure 5:
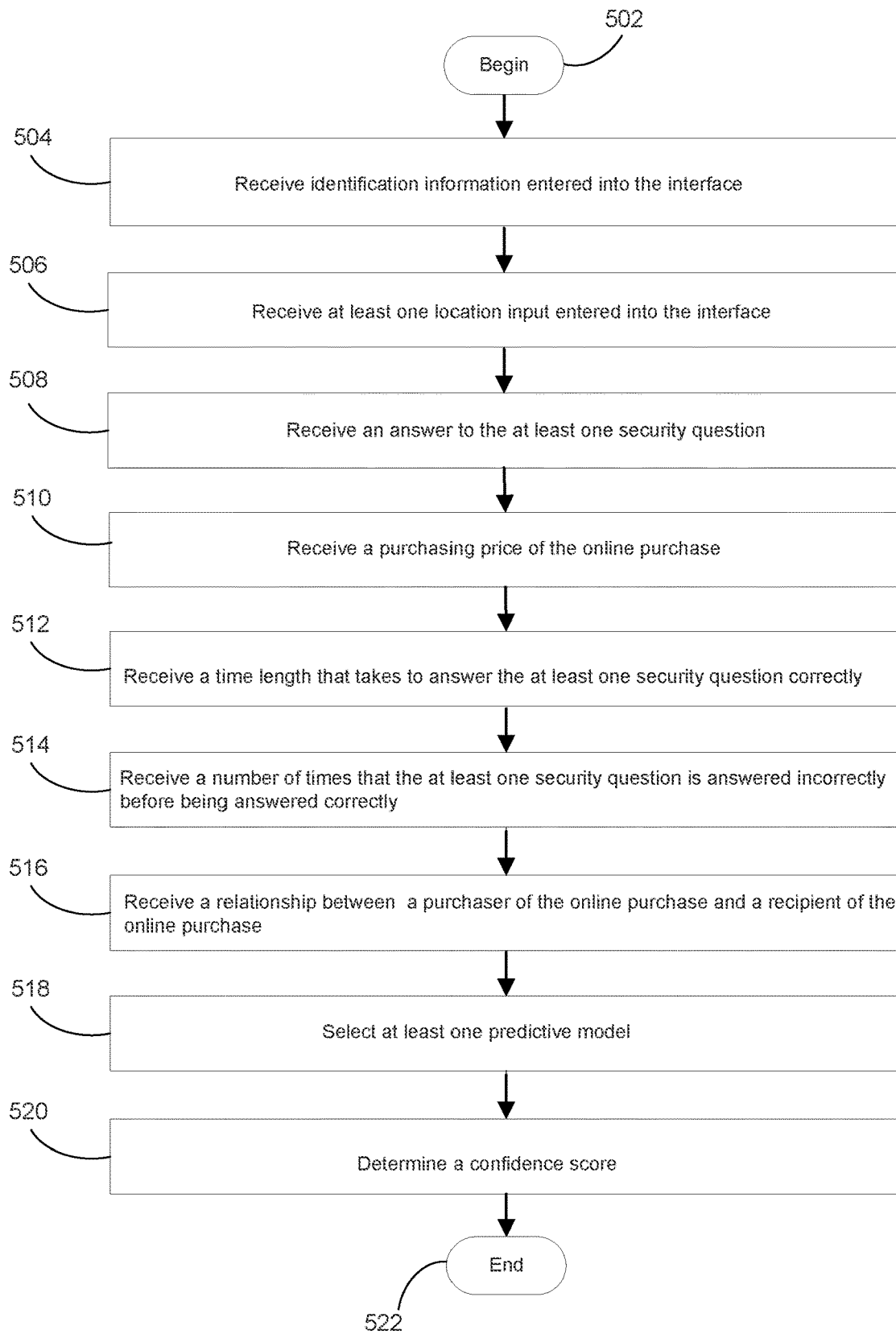
FIG. 5 depicts an example method for determining a confidence score utilizing AI technologies, according to embodiments of the present disclosure.

FIG. 5 depicts an example method 500 that determines a confidence score utilizing AI technologies for managing data access, according to embodiments of the present disclosure. The method may begin at block 502. At block 504, the AI engine may receive identification information entered into the interface. A user may enter the identification information in the interface. The identification information may include the first name and last name of the recipient to who the user may send an online purchased item. The user may utilize various input channels to enter the identification information, which may include utilization of a web interface (e.g., text input), a mobile application like the user application 114 on the user device 110, SMS voice recognition systems, such as Alexa, Siri, Google Assistant, and Microsoft Cortana, and the like.

According to block 506, the AI engine may receive at least one location input entered into the interface. The user may enter the at least one location input in the interface. The at least one location input may include a city name, a state name and/or a zip code where the recipient lives. The user may utilize various input channels to enter the at least one location input, which may include utilization of a web interface (e.g., text input), a mobile application like the user application 114 on the user device 110, SMS voice recognition systems, such as Alexa, Siri, Google Assistant, and Microsoft Cortana, and the like.

At block 508, the AI engine 122 may receive an answer to the at least one security question. As described above, the user may utilize various input channels to enter the answer, which may include utilization of a web interface (e.g., text input), a mobile application like the user application 114 on the user device 110, SMS voice recognition systems, such as Alexa, Siri, Google Assistant, and Microsoft Cortana, and the like. The AI engine 122 may continuously receive from the user answers to follow-up security questions. Similarly, the AI engine 122 may utilize various channels same as or similar to the various input channels used by the user for communicating with the user, for example, transmitting security questions to the user.

A block 510, the AI engine 122 may receive a purchasing price of the online purchase that the user is going to send to the recipient. The purchasing price may be received from the user, for example using the various input channels described above. The purchasing price may also be received from the entity system 130 with whom the user is purchasing the online purchase, for example, through the network 140 from the entity system 130.

At block 512, the AI engine 122 may receive a time length that takes the user to answer the at least one security question correctly. The AI engine 122 may determine the time length, for example, by calculating a time difference between a time at which the AI engine 122 transmits the security question and a time at which the answer to the security question is received by the AI engine 122. The time length may also be provided by the user through the various input channels described above.

At block 514, the AI engine 122 may receive a number of times that the at least one security question is answered incorrectly before being answered correctly. The at least one security question may be the same security question that has been asked repeatedly until a correct answer is received by the AI engine 122. The at least one security question may be different security questions that have been asked until one of them is answered correctly. The AI engine 122 may determine whether a security question is answered correctly by comparing the received answer from the user with the answer stored in the data storage 126. The AI engine 122 may track and count the number of times.

At block 516, the AI engine 122 may receive a relationship between a purchaser (the user) of the online purchase and the recipient of the online purchase. The user may transmit the relationship to the AI engine 122 through the various input channels described above. The AI engine 122 may inquire or retrieve the relationship from a third party, such as an online social network platform where the user and the recipient may friend each other or socially be associated with each other. The relationship may include, but not limited to, friend, sibling, parent, child, wife, husband, classmate, colleague, partner, and the like. The relationship may be determined by the AI engine based on the answer to the at least one security question.

At block 518, the AI engine 122 may select at least one predictive model. Exemplary machine learning algorithms included in the predictive model may include, without limitation, gradient boosting machine, logistic regressions, and neural networks.

At block 520, the AI engine 122 may use the predictive model to determine a confidence score by taking as inputs the above received data and information. For example, the one or more machine learning algorithms may determine the confidence score by taking as inputs the identification information entered into the interface, the at least one location input entered into the interface, the answer to the at least one security question, the purchasing price of the online purchase, the time length that takes the user to answer the at least one security question correctly, the number of times that the at least one security question is answered incorrectly before being answered correctly, and the relationship between the user and the recipient of the online purchase. Unlimited other inputs may also be taken by the AI engine 122 for determining the confidence score, for example, the total number of security questions that have been provided to and answered by the user. Each of the inputs may be assigned a different weight reflecting how much impact that input can have on the confidence score. For example, a family member of the recipient may be assigned to a relatively large weight whereas a casual friend with who the recipient meets on a social network online platform may be assigned to a relatively small weight. The relationship may be assigned to a larger weight comparing to the identification information.

The AI engine 122 may utilize AI technologies to parse and process the input data to extract conditionally relevant meaning from the input data. For example, the AI engine 122 may initially perform signal acquisition and filtering of a signal generated from the input data, which may be followed by further signal compression and decompression, such that the input data is in format from which the AI engine 122 may extract conditionally relevant meaning from the input data. Specifically, the AI engine 122 may utilize AI technologies such as facial recognition, voice recognition and/or natural language processing to translate the received input data into a form that may be utilized by the AI engine 122. The AI engine 122 may utilize a recommendation engine/algorithm to generate recommendations of an address of the recipient based on the determined confidence score.

The confidence score may take various forms. For example, the confidence score may be on a scale of 1 to 5, with 1 being a lowest confidence and 5 being a highest confidence. The confidence score may be on a scale of A to E, with A being a lowest confidence and E being a highest confidence. The confidence score may be on a scale of 20 to 100 having a 20 increase interval, with 20 being a lowest confidence and 100 being a highest confidence. The confidence score may be a Booleans value with "true" being a confidence and "false" being no confidence. The confidence score may also be non-numerical values, such as "no confidence," "slight confidence," "low confidence," "medium confidence," and "high confidence".

The process may end at block 522. Upon completion of determining the confidence score, the determined confidence score may be recorded and stored by the AI-based system 120 for further reference or evaluation in the future. The above process can be repeated.

In some embodiments, the AI engine may be configured to determine the time length that takes the user to answer the at least one security question correctly; and generate and transmit a notification to the recipient when the time length is equal to or great than a time length threshold, wherein the notification notifying the recipient that a person is trying to find an address of the recipient. The recipient may then choose to opt out of the AI system so that his/her personal data may not be discoverable or accessible any more.

In some embodiments, the AI engine may be configured to: determine the number of times that the at least one security question has been answered incorrectly before being answered correctly; and generate and transmit a notification to the recipient when the number of times is equal to or great than a number threshold, wherein the notification notifying the recipient that a person is trying to find a address of the recipient. The recipient may then choose to opt out of the AI system so that his/her personal data may not be discoverable or accessible any more.

FIG. 6 illustrates examples of security questions according to an embodiment. As shown in FIG. 6, the security question may be "What is the mother's maiden name of the recipient?" as shown in Example 1 (610). The security question may be "How long has the recipient lived at this address?" as shown in Example 2 (620). The security question may be "Who is a favorite artist of the recipient?" as shown in Example 3 (630). The security question may be "What song is the recipient always playing?" as shown in Example 4 (640). The security question may be "What is the name of a relative of the recipient?" as shown in Example 5 (650). It is understood that these security questions are exemplary and non-limiting. In other examples additional security questions may be asked.

FIG. 7 illustrates some examples of masked addresses according to an embodiment. After the AI engine automatically finish filling out all the necessary address fields on the interface, the address may be masked completely or partially, for example, based on the determined confidence score. For example, a high confidence score may require the address to be masked partially or not masked at all, whereas a low confidence score may require the address to be masked completely. Whether or not masking the address of the recipient may also be determined based on predefined conditions by the recipient that are stored in the AI system. For example, the recipient may require the address to be masked completely for a person other family members of the recipient. As shown in 720 of FIG. 7, the address is completely masked with symbols "x", and as shown in 740 of FIG. 7, the address is partially masked with symbols "x".

The terms "condition" and "transaction" are used throughout this specification and it is understood that the present disclosure is not limited to any particular conditions or transactions. Rather, the present disclosure includes any transaction, activity, or operation and these transactions, activities, and operations can be subject to any condition, prerequisites, or requirements.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

The foregoing description, along with its associated embodiments, has been presented for purposes of illustration only. It is not exhaustive and does not limit the invention to the precise form disclosed. Those skilled in the art may appreciate from the foregoing description that modifications and variations are possible in light of the above teachings or may be acquired from practicing the disclosed embodiments. For example, the steps described need not be performed in the same sequence discussed or with the same degree of separation. Likewise various steps may be omitted, repeated, or combined, as necessary, to achieve the same or similar objectives. Accordingly, the invention is not limited to the above-described embodiments, but instead is defined by the appended claims in light of their full scope of equivalents.

In the preceding specification, various preferred embodiments have been described with references to the accompanying drawings. It may, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

What is claimed is:

1. An artificial intelligence (AI) system for managing data access, comprising:
    a data storage containing user identification information, user location information, user security questions, and answers to the user security questions;
    a communication interface coupled to the data storage; and
    an AI engine in data communication with the data storage and coupled to an application programming interface (API) that enables transmission of real time data through the communication interface, wherein the AI engine is configured to:
        receive identification information entered into an interface displayed on a web page,
        receive at least one location input entered into the interface,
        select at least one security question from the user security questions and present the selected at least one security question via the interface,
        receive an answer to the at least one security question,
        perform signal acquisition and filtering of a signal generated from the at least one security question and answer,
        perform signal compression and decompression, such that the at least one security question and answer is in a format of which the AI engine extracts conditionally relevant meaning,
        apply a predictive model to determine a confidence score based on the identification information entered into the interface, the location input entered into the interface, and the answer to the at least one security question,
        upon determining that the confidence score exceeds a confidence score threshold, provide user location information, the user location information selected from the user location information stored in the data storage, and
        mask the provided user location information to conceal the user location information from display on the interface, wherein
        the interface is a graphical user interface (GUI),
        the AI engine generates the GUI to be displayed on the web page,
        the AI engine presents the at least one security question on the GUI,
        the AI engine receives the answer to the at least one security question from the GUI, and
        the answer to the at least one security question is entered into the GUI.

2. The AI system of claim 1, wherein the user location information is at least one selected from the group of an electronic address and a physical address.

3. The AI system of claim 1, wherein:
    the at least one security question is presented in a first text message through the communication interface to a user device, and
    the answer to the at least one security question is received in a second text message through the communication interface from the user device.

4. The AI system of claim 1, wherein the confidence score is determined by:
    comparing the user identification information in the data storage with a name of a recipient entered into the interface,
    comparing the user location information in the data storage with the at least one selected from the group of a city name, a state name, a zip code, and a street name entered into the interface, and
    comparing the answer to the at least one security question with the answers to the user security questions in the data storage.

5. The AI system of claim 1, wherein the predictive model includes at least one selected from the group of a hidden Markov model, a Gaussian mixture model, a pattern matching algorithm, a neural network, a matrix representation, a vector quantization and decision tree, a supervised learning model, an unsupervised learning model, a semi-supervised learning model, a reinforcement learning model, a self-learning model, and a feature learning model.

6. The AI system of claim 1, wherein the data storage further contains an indicator for each user indicating whether the user opts out or opts in for disclosing an address of the user.

7. The AI system of claim 6, wherein the indicator further indicates that the user opts out or opts in for disclosing the address of the user for a specified period of time or specified events.

8. The AI system of claim 1, wherein the user security questions and the answers to the user security questions in the data storage are imported from at least one third party.

9. The AI system of claim 1, wherein the AI engine is further configured to:

generate a notification based on the determined confidence score, the generated notification indicating a degree to which how accurate the provided user location information matches an actual address of a recipient, and transmit through the communicate interface the generated notification.

10. The AI system of claim 1, wherein the AI engine is further configured to determine the confidence score based on a purchasing price of the online purchase.

11. The AI system of claim 1, wherein, when the determined confidence score is less than the confidence score threshold, the AI engine is further configured to trigger a recommendation for an insurance policy.

12. The AI system of claim 1, wherein the confidence score is further determined based on at least one selected from the group of a time length that takes to answer the at least one security question correctly, and a number of times that the at least one security question is answered incorrectly before being answered correctly.

13. The AI system of claim 1, wherein the AI engine is further configured to:
determine a time length that takes to answer the at least one security question correctly, and
generate and transmit a notification to a recipient when the time length is equal to or great than a time length threshold, wherein the notification notifying the recipient that a person is trying to find a delivery address of the recipient.

14. The AI system of claim 1, wherein the AI engine is further configured to:
determine a number of times that the at least one security question has been answered incorrectly before being answered correctly, and
generate and transmit a notification to a recipient when the number of times is equal to or great than a number threshold, wherein the notification notifying the recipient that a person is trying to find a delivery address of the recipient.

15. The AI system of claim 1, further comprising at least one machine learning model, wherein the confidence score is determined by the at least one machine learning model by weighting a name of a recipient entered into the interface, at least one selected from the group of a city name, a state name, a zip code, and a street name entered into the interface, and the answer to the at least one security question.

16. The AI system of claim 1, wherein the AI engine is further configured to:
determine a relationship between a user and a recipient of the online purchase based on the answer to the at least one security question, and
present one or more follow-up security questions related to the recipient to the user based on the relationship.

17. The AI system of claim 1, wherein the AI engine is further configured to:
determine a relationship between a user and a recipient of the online purchase based on the answer to the at least one security question, and
determine the confidence score based on the relationship.

18. An artificial intelligence (AI) method for managing data access, comprising:
receiving, by an AI engine, identification information entered into an interface displayed on a web page;
receiving, by the AI engine, at least one location input entered into the interface;

selecting, by the AI engine, at least one security question from user security questions and presenting the selected at least one security question via the interface, the user security questions being stored in a data storage, and the data storage further containing user identification information, user location information, and answers to the user security questions;
receiving, by the AI engine, an answer to the at least one security question;
performing, by the AI engine, signal acquisition and filtering of a signal generated from the at least one security question and answer;
performing, by the AI engine, signal compression and decompression, such that the at least one security question and answer is in a format of which the AI engine extracts conditionally relevant meaning;
applying, by the AI engine, a predictive model to determine a confidence score based on the identification information entered into the interface, the location input entered into the interface, and the answer to the at least one security question;
upon determining that the confidence score exceeds a confidence score threshold, providing, by the AI engine, user location information, the user location information selected from the user location information stored in the data storage; and
masking, by the AI engine, the provided user location information to conceal the user location information from display on the interface,
wherein:
the AI engine is in data communication with the data storage through a communication interface, and
the AI engine is coupled to an application programming interface (API) that enables transmission of real time data through the communication interface, and
wherein:
the interface is a graphical user interface (GUI),
the AI engine generates the GUI to be displayed on the web page,
the AI engine presents the at least one security question on the GUI,
the AI engine receives the answer to the at least one security question from the GUI, and
the answer to the at least one security question is entered into the GUI.

19. A non-transitory computer-accessible medium having stored thereon computer-executable instructions for managing data access, wherein, when the instructions are executed by a computer arrangement, the computer arrangement comprising an artificial intelligence (AI) engine is configured to perform procedures comprising:
receiving, by the AI engine, identification information entered into an interface displayed on a web page;
receiving, by the AI engine, at least one location input entered into the interface;
selecting, by the AI engine, at least one security question from user security questions and presenting the selected at least one security question via the interface, the user security questions being stored in a data storage, and the data storage further containing user identification information, user location information, and answers to the user security questions;
receiving, by the AI engine, an answer to the at least one security question;
performing, by the AI engine, signal acquisition and filtering of a signal generated from the at least one security question and answer;

performing, by the AI engine, signal compression and decompression, such that the at least one security question and answer is in a format of which the AI engine extracts conditionally relevant meaning;

applying, by the AI engine, a predictive model to determine a confidence score based on the identification information entered into the interface, the location input entered into the interface, and the answer to the at least one security question;

upon determining that the confidence score exceeds a confidence score threshold, providing, by the AI engine, user location information, the user location information selected from the user location information stored in the data storage; and masking, by the AI engine, the provided user location information to conceal the user location information from display on the interface, wherein:
- the AI engine is in data communication with the data storage through a communication interface, and
- the AI engine is coupled to an application programming interface (API) that enables transmission of real time data through the communication interface, and wherein:
- the interface is a graphical user interface (GUI),
- the AI engine generates the GUI to be displayed on the web page,
- the AI engine presents the at least one security question on the GUI,
- the AI engine receives the answer to the at least one security question from the GUI, and
- the answer to the at least one security question is entered into the GUI.

* * * * *